United States Patent
Hitosugi et al.

(10) Patent No.: US 8,050,839 B2
(45) Date of Patent: Nov. 1, 2011

(54) VEHICLE BEHAVIOR DETECTION APPARATUS

(75) Inventors: Kazuo Hitosugi, Chiyoda-ku (JP);
Takanori Matsunaga, Chiyoda-ku (JP);
Hideyuki Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 484 days.

(21) Appl. No.: 12/355,405

(22) Filed: Jan. 16, 2009

(65) Prior Publication Data
US 2009/0228168 A1  Sep. 10, 2009

(30) Foreign Application Priority Data
Mar. 4, 2008 (JP) ................. 2008-053460

(51) Int. Cl.
*G06F 7/00* (2006.01)
(52) U.S. Cl. ................ 701/80; 701/65; 701/73
(58) Field of Classification Search .......... 701/70, 701/80, 65, 73, 36, 29, 71
See application file for complete search history.

(56) References Cited

U.S. PATENT DOCUMENTS

| | | | | |
|---|---|---|---|---|
| 5,657,229 A * | 8/1997 | Naito et al. | ........................ | 701/71 |
| 5,947,221 A * | 9/1999 | Taniguchi et al. | ............... | 180/197 |
| 6,091,214 A * | 7/2000 | Yamawaki et al. | ............... | 318/52 |
| 6,131,693 A * | 10/2000 | Mukai et al. | ................... | 180/446 |
| 6,496,762 B2 * | 12/2002 | Kurishige et al. | ................ | 701/41 |
| 6,527,079 B2 * | 3/2003 | Takeuchi et al. | ................ | 180/443 |
| 7,212,902 B2 * | 5/2007 | Fujioka et al. | ................... | 701/70 |
| 7,349,775 B2 * | 3/2008 | Fujioka et al. | ................... | 701/29 |
| 7,412,318 B2 * | 8/2008 | Fujioka et al. | ................... | 701/70 |
| 7,412,319 B2 * | 8/2008 | Fujioka et al. | ................... | 701/70 |
| 7,454,279 B2 * | 11/2008 | Fujioka et al. | ................... | 701/70 |
| 7,571,033 B2 * | 8/2009 | Fujioka et al. | ................... | 701/29 |
| 7,698,032 B2 * | 4/2010 | Matsumoto et al. | ............. | 701/36 |
| 2003/0220730 A1 * | 11/2003 | Fujioka et al. | ................... | 701/70 |

FOREIGN PATENT DOCUMENTS

| | | |
|---|---|---|
| DE | 10301435 A1 | 12/2003 |
| JP | 2003-341538 A | 12/2003 |
| JP | 2004130965 A | 4/2004 |
| JP | 2005-324737 A | 11/2005 |
| JP | 2006298156 A | 11/2006 |
| JP | 2007253828 A | 10/2007 |
| JP | 2007290492 A | 11/2007 |

OTHER PUBLICATIONS

Japanese Office Action corresponding to Japanese Patent Application No. 2008-053460, dated Dec. 24, 2009.

\* cited by examiner

*Primary Examiner* — Paul N Dickson
*Assistant Examiner* — Nicole Verley
(74) *Attorney, Agent, or Firm* — Sughrue Mion, PLLC

(57) ABSTRACT

A vehicle behavior detection apparatus can accurately detect an unstable state of a vehicle without making an incorrect determination even if a travel environment of the vehicle is abnormal. The apparatus includes a road surface reaction torque detecting unit that detects a road surface reaction torque which a tire of the vehicle receives from a road surface, a steering angle detecting unit that detects a steering angle of the vehicle, a vehicle speed detecting unit that detects a speed of the vehicle, a standard road surface reaction torque calculating unit that calculates a standard road surface reaction torque from the steering angle and the vehicle speed, a vehicle behavior state detecting unit that detects the unstable state of the vehicle, and a vehicle behavior detection inhibiting unit that invalidates the vehicle behavior state detecting unit based on the road surface reaction torque and the standard road surface reaction torque.

7 Claims, 12 Drawing Sheets

VEHICLE BEHAVIOR DETECTION APPARATUS

BACKGROUND OF THE INVENTION

1. Field of the Invention

This invention relates to a vehicle behavior detection apparatus for detecting a state of unstable behavior such as understeer, etc., of a vehicle during traveling (hereinafter simply referred as an "unstable state").

2. Description of the Related Art

Conventionally, there has been proposed a vehicle state detection apparatus as a vehicle behavior detection apparatus that detects an unstable state (an understeer state, etc.) of a vehicle during the time when the vehicle is traveling (see, for example, a first patent document: Japanese patent application laid-open No. 2003-341538).

A vehicle state detection apparatus described in the first patent document includes a standard alignment torque calculating unit that calculates a standard alignment torque corresponding to a standard road surface reaction torque, an alignment torque measuring unit that detects an actual alignment torque corresponding to a road surface reaction torque which a vehicle traveling on a road receives from the surface of the road, an alignment torque deviation calculating unit that calculates an absolute value of a deviation between the actual alignment torque and the standard alignment torque as an alignment torque deviation, and a vehicle behavior stability determining unit that compares the alignment torque deviation with a predetermined amount, and determines that the behavior of the vehicle is unstable when the alignment torque deviation is equal to or larger than the predetermined amount, wherein an unstable state of the vehicle during traveling is determined by using the absolute value of the deviation between the standard alignment torque and the actual alignment torque.

In addition, the vehicle state detection apparatus described in the aforementioned first patent document further includes a torque/steering angle calculating unit that calculates the rates of change of the actual alignment torque and the steering angle from the time rate of change of the actual steering wheel operation angle and the time rate of change of the actual alignment torque, wherein the unstable state of the vehicle during traveling is determined by using the rates of change of the actual alignment torque and the steering angle.

In the conventional vehicle behavior detection apparatus, the absolute value of the deviation between the standard alignment torque and the actual alignment torque or the rates of change of the actual alignment torque and the standard alignment torque is used to determine the unstable state of the vehicle during traveling, but no consideration has been given to bad travel environments in which the vehicle is traveling on a bad road such as a cant road (i.e., a sloped surface road), a unpaved road, or the like, so there has been a problem that an incorrect determination on the unstable state of the vehicle might be made depending upon the travel environment of the vehicle.

SUMMARY OF THE INVENTION

Accordingly, the present invention is intended to solve the problem as referred to above, and has for its object to obtain a vehicle behavior detection apparatus which is capable of detecting an unstable state of a vehicle in an accurate manner without making an incorrect determination even if a travel environment of the vehicle is abnormal.

Bearing the above object in mind, a vehicle behavior detection apparatus according to the present invention includes: a road surface reaction torque detecting unit that detects a road surface reaction torque which a tire of a vehicle receives from a road surface; a steering angle detecting unit that detects a steering angle of the vehicle; a vehicle speed detecting unit that detects a vehicle speed of the vehicle; a standard road surface reaction torque calculating unit that calculates a standard road surface reaction torque from individual detected values of the steering angle and the vehicle speed; a vehicle behavior state detecting unit that detects an unstable state of the vehicle; and a vehicle behavior detection inhibiting unit that invalidates the vehicle behavior state detecting unit based on a detected value of the road surface reaction torque and a calculated value of the standard road surface reaction torque.

According to the present invention, when at least one of the deviation and the ratio between the road surface reaction torque and the standard road surface reaction torque is larger than a preset threshold, it is determined that the vehicle is traveling on a bad road, and an unstable state of the vehicle is inhibited from being detected. As a result, the unstable state of the vehicle can be detected in an accurate manner while avoiding an incorrect determination thereof even when the vehicle is traveling on a bad road such as a cant road or the like The above and other objects, features and advantages of the present invention will become more readily apparent to those skilled in the art from the following detailed description of preferred embodiments of the present invention when taken in conjunction with the accompanying drawings.

BEST MODE FOR CARRYING OUT THE INVENTION

Hereinafter, preferred embodiments of the present invention will be described in detail while referring to the accompanying drawings.

Embodiment 1

Figure 1:
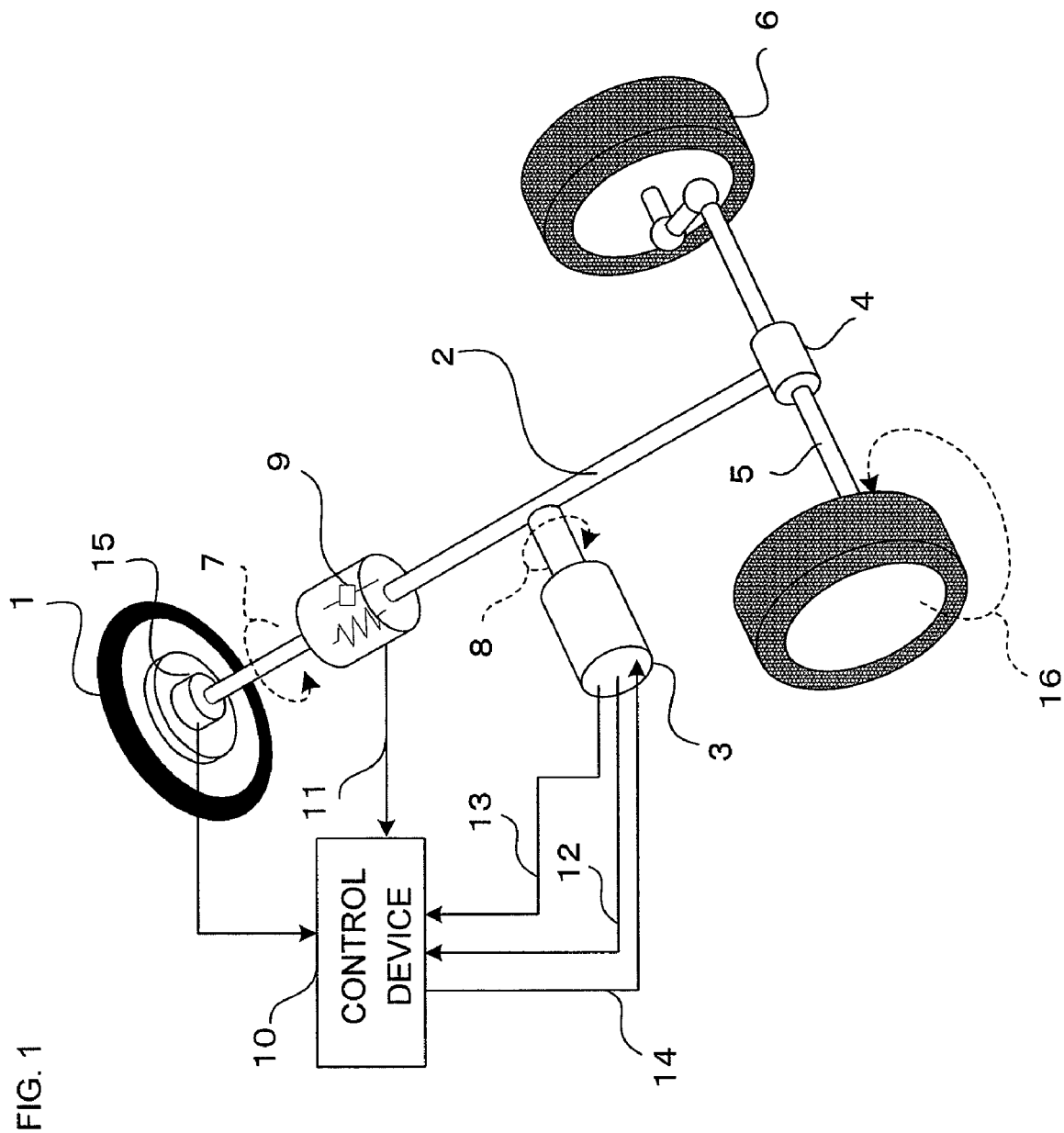
FIG. 1 is a perspective view schematically showing an overall construction of a vehicle steering system with a typical vehicle behavior detection apparatus according to the present invention installed thereon.

Referring to the drawings and first to FIG. 1, therein is shown, in a perspective view, an overall construction of a vehicle steering system having a vehicle behavior detection apparatus according to first embodiment of the present invention installed thereon.

In FIG. 1, the vehicle steering system serves to increase or amplify, by several times, a torque, which is the sum of a steering torque 7 applied from a steering wheel 1 to a steering column 2 of a vehicle by a driver and an assist torque 8 added from a motor 3 to the steering column 2, by means of a steering gear box 4, and further to drive tires 6 of the vehicle to rotate through a rack and pinion mechanism 5.

A steering angle sensor 15 is mounted on the steering wheel 1, and outputs a steering angle detection signal corresponding to a detected value of a steering angle.

A torque sensor 9 is mounted on the steering shaft 2 for detecting the steering torque 7 applied to the steering wheel 1 by a driver. The torque sensor 9 outputs a detected steering torque signal 11 corresponding to a detected value of the steering torque 7 thus detected.

In addition, a vehicle speed sensor (not shown) is arranged in the vicinity of a tire 6 for detecting the speed of the vehicle as a vehicle speed.

A control device 10 receives the detection signals from the respective sensors 9, 15, and serves to calculate a voltage 14 to be applied to the motor 3 by using the detection signals as input information to drive and control the motor 3. The control device 10 uses a detected current signal 12 and a detected voltage signal 13 from the motor 3 as feedback input information.

Also, as will be described later, the control device 10 includes a vehicle behavior state detecting unit 26 that detects a road surface reaction torque 16 applied from the road to a tire 6, and detects an unstable state of the vehicle based on the road surface reaction torque 16 thus detected, the vehicle, etc.

The vehicle steering system includes the control device 10 and the motor 3 related to the steering column 2, and has a main function of causing an amount of the assist torque 8 corresponding to the steering torque 7 of the driver to be generated.

That is, the torque sensor 9 measures the steering torque 7 generated when the driver operates the steering wheel 1, and inputs the detected steering torque signal 11 to the control device 10. The control device 10 applies the voltage 14 for generating the assist torque 8 to the motor 3 based on a quantity of state of the motor 3 (i.e., the detected current signal 12 and the detected voltage signal 13) and the detected steering torque signal 11.

Figure 2:
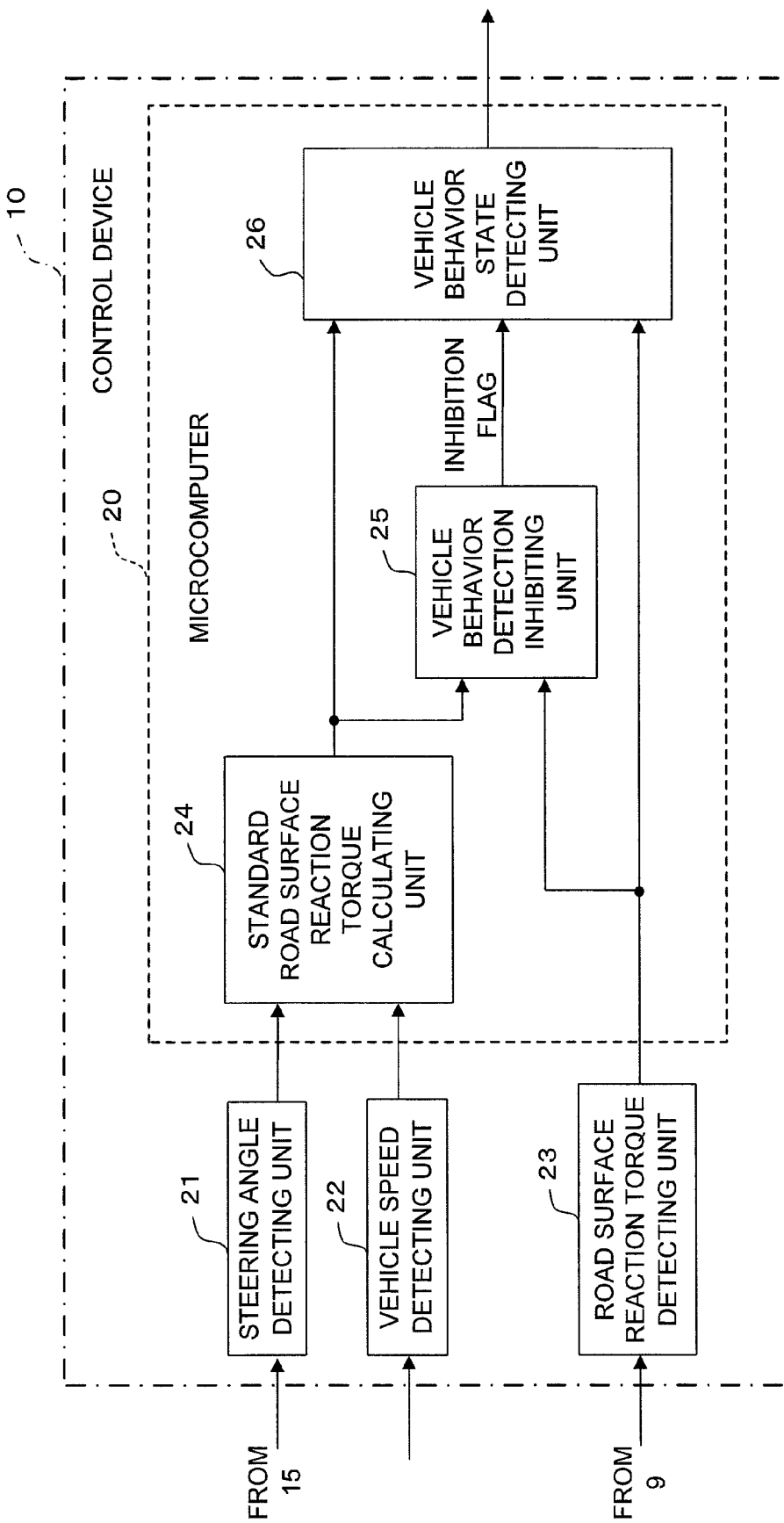
FIG. 2 is a block diagram showing the construction of a vehicle behavior detection apparatus according to a first embodiment of the present invention.

FIG. 2 is a block diagram showing the control device 10 which is a major part of the vehicle behavior detection apparatus according to the first embodiment of the present invention, wherein the functions included in the vehicle steering system are illustrated.

Although in FIG. 2, the control device 10 and a microcomputer 20 have various functions of the vehicle steering system other than those illustrated therein, only those portions thereof which are related to the vehicle behavior detection apparatus are shown herein.

The control device 10 includes a steering angle detecting unit 21 that detects the steering angle of the steering wheel 1 operated by the driver in association with the steering angle sensor 15, a vehicle speed detecting unit 22 that detects the speed of the vehicle in association with the unillustrated vehicle speed sensor, a road surface reaction torque detecting unit 23 that detects the road surface reaction torque 16 generated between the tire 6 and the road surface in association with the torque sensor 9, and a microcomputer 20 that detects the state of the vehicle behavior by using the detected values of the respective detecting units 21 through 23 as input information.

The microcomputer 20 includes a standard road surface reaction torque calculating unit 24, a vehicle behavior detection inhibiting unit 25, and the vehicle behavior state detecting unit 26.

The standard road surface reaction torque calculating unit 24 calculates a standard road surface reaction torque (i.e., an ideal road surface reaction torque) by using the individual detected values (i.e., the steering angle and the vehicle speed) from the steering angle detecting unit 21 and the vehicle speed detecting unit 22 as input information.

The vehicle behavior detection inhibiting unit 25 determines, based on the detected value (the road surface reaction torque 16) from the road surface reaction torque detecting unit 23 and the calculated value (the standard road surface reaction torque) from the standard road surface reaction torque calculating unit 24, whether the vehicle behavior state detecting unit 26 should be invalidated (inhibited), and outputs an inhibition flag in case where it is determined that the vehicle behavior state detecting unit 26 should be invalidated.

The vehicle behavior state detecting unit 26 detects the unstable state of the vehicle based on the detected value from the road surface reaction torque detecting unit 23 and the calculated value from the standard road surface reaction torque calculating unit 24. The vehicle behavior state detecting unit 26 is inhibited from outputting the result of its vehicle behavior state detection in response to the inhibition flag from the vehicle behavior detection inhibiting unit 25.

Here, note that in the standard road surface reaction torque calculating unit 24, a well-known technique (see, for example, Japanese patent application laid-open No. 2005-324737) is used to calculate the standard road surface reaction torque from the quantity of the traveling state of the vehicle. That is, the standard road surface reaction torque can be calculated from the relations of the slope of the road surface reaction torque with respect to the steering angle, the vehicle speed and the steering angle, which have been determined in advance for individual prescribed vehicle speeds, respectively.

In the road surface reaction torque detecting unit 23, too, the above-mentioned well-known technique is used. For example, the road surface reaction torque 16 can be estimated from the steering torque 7 of the driver and the assist torque 8 of the electric power steering or the motor 3.

In addition, the individual detection results and calculation results of the road surface reaction torque detecting unit 23, the standard road surface reaction torque calculating unit 24, the vehicle behavior detection inhibiting unit 25, and the vehicle behavior state detecting unit 26 are stored in a memory (not shown) in the microcomputer 20.

The above-mentioned are similar in a second embodiment to be described later.

Now, reference will be made to the operation of the vehicle behavior detection apparatus (i.e., the control device 10) according to the first embodiment of the present invention while referring to a flow chart of FIG. 3 together with FIGS. 1 and 2.

Figure 3:
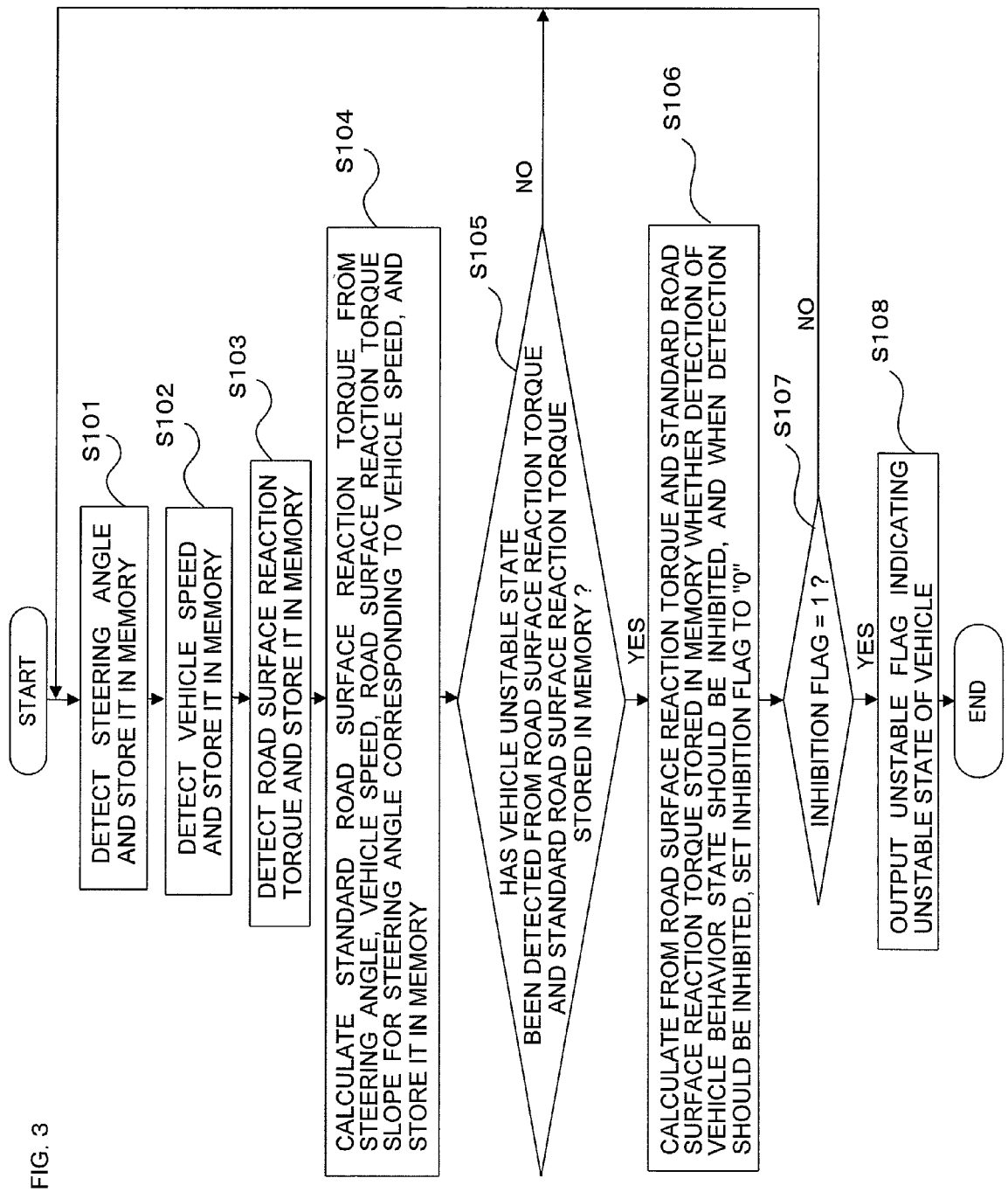
FIG. 3 is a flow chart illustrating the operation of the vehicle behavior detection apparatus according to the first embodiment of the present invention.

In FIG. 3, first of all, when a control program is started to be executed by the microcomputer 20, the steering angle detecting unit 21 including the steering angle sensor 15 detects the steering angle of the steering wheel 1 and stores the detected value thereof in the memory (step S101).

Similarly, the vehicle speed detecting unit 22 including the vehicle speed sensor detects the vehicle speed and stores the detected value thereof in the memory (step S102).

In addition, the road surface reaction torque detecting unit 23 detects the road surface reaction torque and stores the detected value thereof in the memory (step S103).

Subsequently, the standard road surface reaction torque calculating unit 24 calculates the standard road surface reaction torque based on the steering angle and the vehicle speed stored in the memory, as well as the road surface reaction torque slope (stored beforehand) for the steering angle corresponding to the vehicle speed, and stores the calculated value thereof in the memory (step S104).

Thereafter, the vehicle behavior state detecting unit 26 determines, from the road surface reaction torque 16 and the standard road surface reaction torque stored in the memory, whether the unstable state of the vehicle has been detected (step S105). When the unstable state of the vehicle has not been detected and it is determined as the vehicle behavior being in a stable state (that is, NO), a return is made to step S101 (Start).

On the other hand, when in step S105 it is determined as the vehicle behavior being in an unstable state (that is, YES), the vehicle behavior detection inhibiting unit 25 calculates, from the road surface reaction torque 16 and the standard road surface reaction torque stored in the memory, whether the vehicle behavior state detecting unit 26 should be invalidated (i.e., the detection of the vehicle unstable state should be inhibited). When it is determined that the invalidation (inhibition) should be done, the vehicle behavior detection inhibiting unit 25 sets the inhibition flag to "0" and outputs it (step S106), whereas when it is determined that the invalidation (inhibition) should not be done, the inhibition flag is set to "1".

Subsequently, by referring to the inhibition flag set in step S106, the vehicle behavior state detecting unit 26 determines whether the inhibition flag is "1" (step S107). When it is determined as the inhibition flag being equal to 0 (that is, NO), it is necessary to inhibit the vehicle behavior detection, and hence a return is made to step S101 (Start) without performing the output processing of an unstable flag (step S108).

On the other hand, when in step S107 it is determined as the inhibition flag being equal to 1 (that is, YES), it is necessary to detect the vehicle unstable state, and hence the vehicle behavior state detecting unit 26 outputs an unstable flag (i.e., indicating the unstable state of the vehicle) according to the determination result in step S105 (step S108), after which the program operation of FIG. 3 is terminated.

Next, specific reference will be made to the operation of the vehicle behavior detection inhibiting unit 25 while referring to FIG. 4 and FIG. 5.

Figure 4:
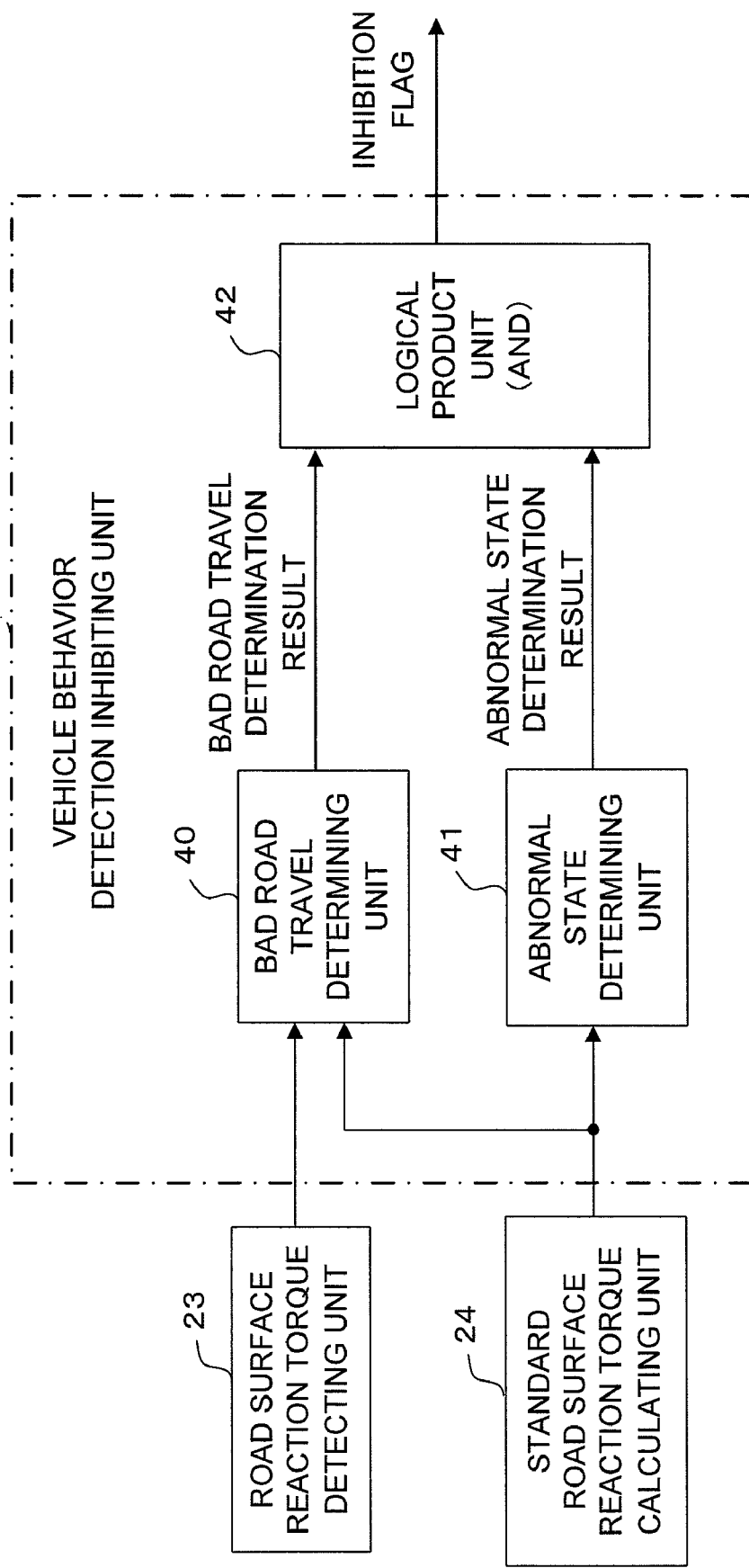
FIG. 4 is a block diagram showing the construction of a vehicle behavior detection inhibiting unit according to the first embodiment of the present invention.

FIG. 4 is a block diagram showing the functional construction of the vehicle behavior detection inhibiting unit 25. In FIG. 4, the vehicle behavior detection inhibiting unit 25 includes a bad road travel determining unit 40, an abnormal state determining unit 41, and a logical product unit 42.

When it is determined from the detected value of the road surface reaction torque and the calculated value of the standard road surface reaction torque that the vehicle is traveling on a bad road, the bad road travel determining unit 40 outputs a determination result of traveling in a bad road (a flag "0").

When it is determined from the calculated value of the standard road surface reaction torque that the vehicle is in an abnormal state, the abnormal state determining unit 41 outputs an abnormal state determination result (a flag "0").

The logical product unit 42 calculates the logical product of the bad road traveling determination result and the abnormal state determination result, and outputs an inhibition flag "1" (i.e., indicating that the detection is not inhibited but permitted or possible) only when the vehicle is not traveling on a bad road (flag "1") and when the vehicle is not in an abnormal state (flag "1").

On the other hand, when it is determined that the vehicle is traveling on a bad road (flag "0") or the vehicle is in an abnormal state (flag "0"), the logical product unit 42 outputs a final inhibition flag "0". That is, the inhibition flag becomes "0" when the vehicle behavior state detection should be inhibited, as previously stated, whereas it becomes "1" when the vehicle behavior state detection is permitted or possible.

Figure 5:
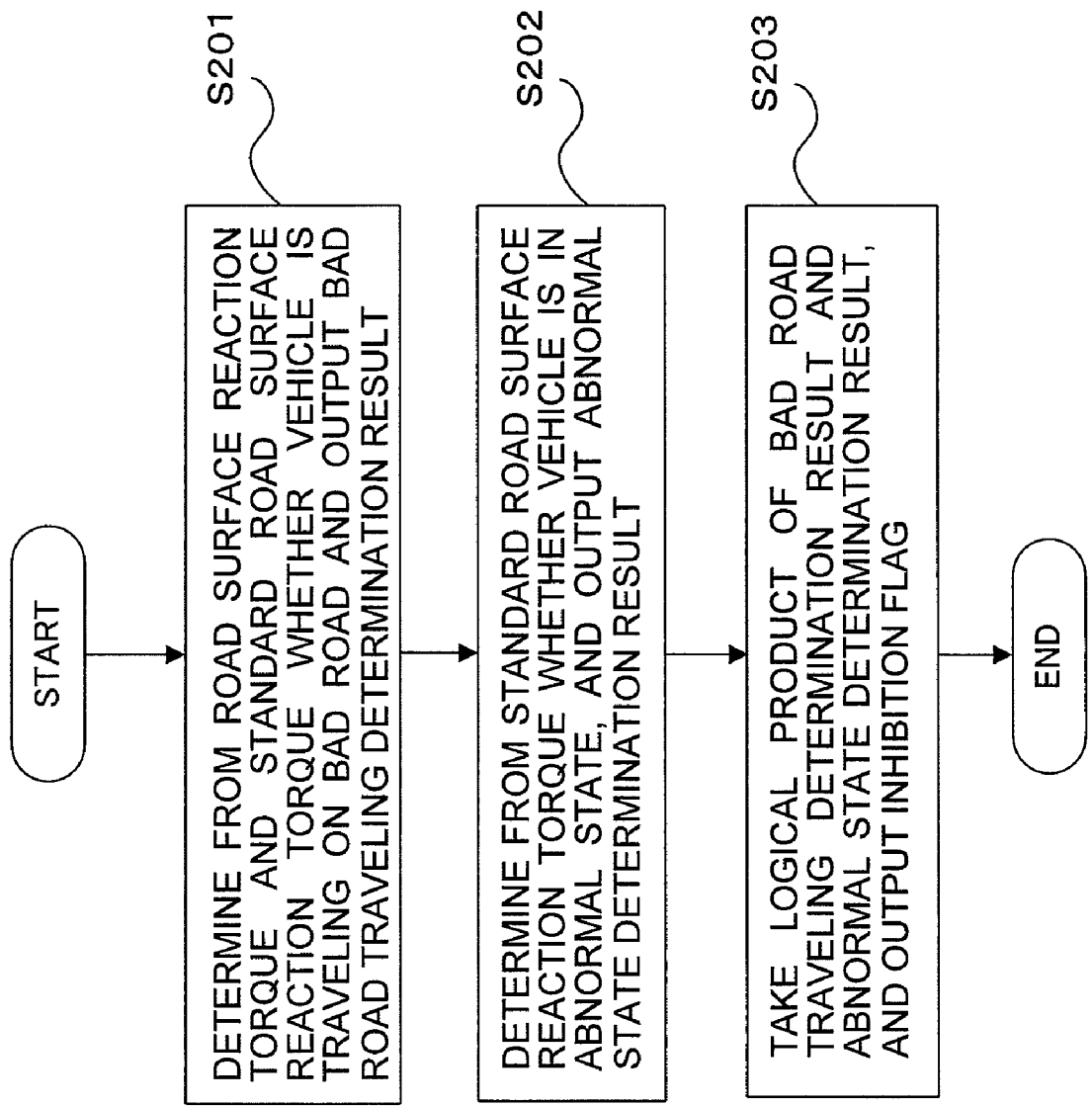
FIG. 5 is a flow chart illustrating the operation of the vehicle behavior detection inhibiting unit according to the first embodiment of the present invention.

FIG. 5 is a flow chart illustrating the operation of the vehicle behavior detection inhibiting unit 25. In FIG. 5, first of all, the bad road travel determining unit 40 determines, from the road surface reaction torque and the standard road surface reaction torque, whether the vehicle is traveling on a bad road, and outputs a bad road traveling determination result (e.g., a flag "0" in case where the vehicle is traveling on a bad road).

In addition, the abnormal state determining unit 41 determines, from the standard road surface reaction torque, whether the vehicle is in an abnormal state, and outputs an abnormal state determination result (e.g., a flag "0" in the case of the vehicle being in an abnormal state) (step S202).

Finally, the logical product unit 42 calculates the logical product of the bad road traveling determination result and the abnormal state determination result, and outputs an inhibition flag (e.g., "0" in the case of inhibition) (step S203), after which the program operation of FIG. 5 is terminated.

Hereinafter, specific reference will be made to the operation of the bad road travel determining unit 40 in the vehicle behavior detection inhibiting unit 25 while referring to FIG. 6 and FIG. 7.

Figure 6:
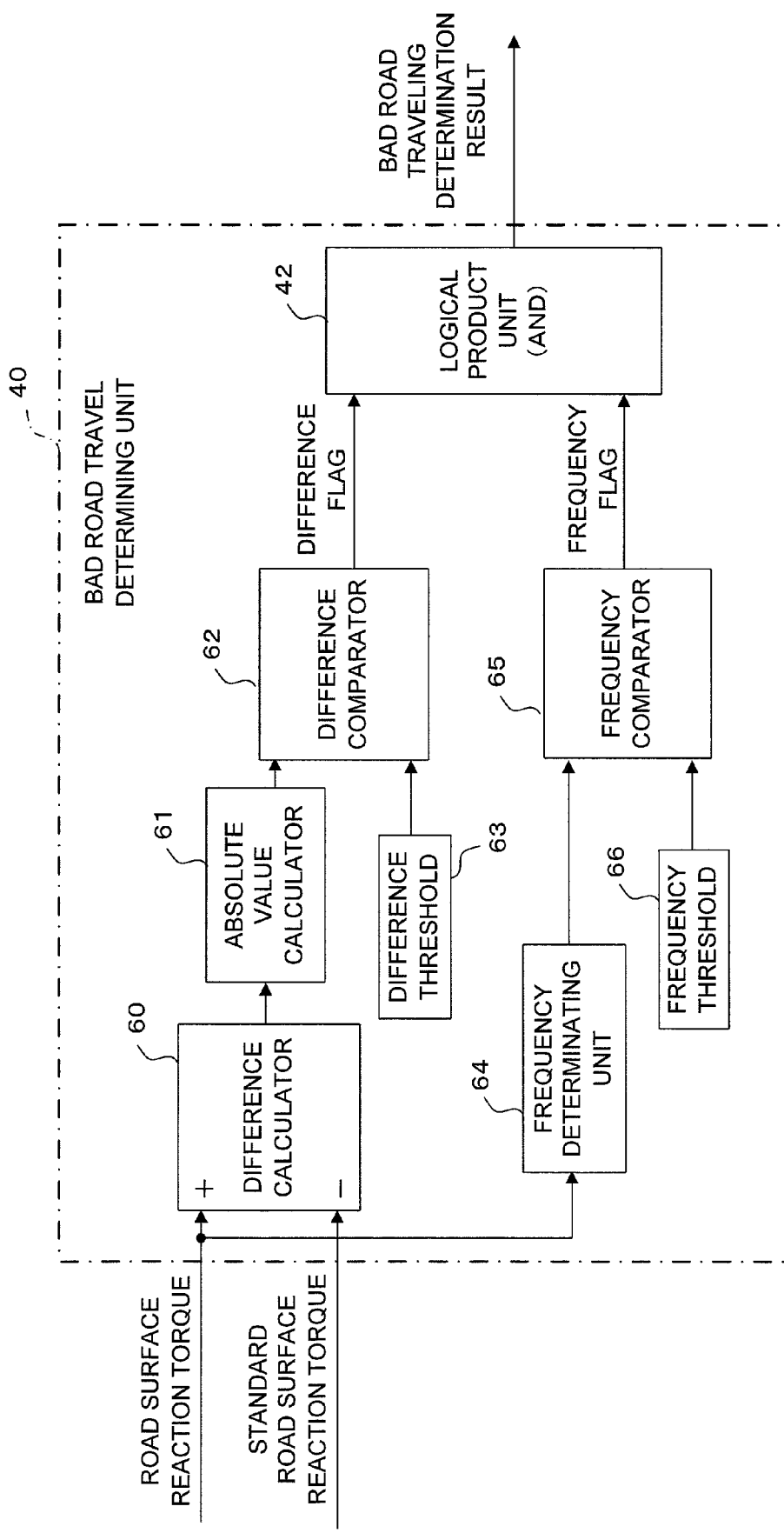
FIG. 6 is a block diagram showing the construction of a bad road travel determining unit according to the first embodiment of the present invention.

FIG. 6 is a block diagram showing the functional construction of the bad road travel determining unit 40. In FIG. 6, the bad road travel determining unit 40 includes a difference calculator 60, an absolute value calculator 61, a difference comparator 62, a frequency determining unit 64, a frequency comparator 65, and a logical product unit 42.

The difference calculator 60 calculates a difference between the road surface reaction torque and the standard road surface reaction torque, and the absolute value calculator 61 calculates an absolute value of the difference which has been calculated and output from the difference calculator 60.

The difference comparator 62 compares the absolute value of the difference between the road surface reaction torque and the standard road surface reaction torque with a predetermined difference threshold 63 which has been set in advance, and sets the difference flag to "0" and outputs it when the absolute value of the difference is larger than the difference threshold 63. When otherwise (i.e., the absolute value of the difference≦the difference threshold), the difference comparator 62 sets the difference flag to "1".

The frequency determining unit 64 reads in the road surface reaction torque, determines and outputs the frequency of the road surface reaction torque.

The frequency comparator 65 compares the road surface reaction torque frequency with a predetermined frequency threshold 66, and sets the frequency flag to "0" and outputs it when the road surf-ace reaction torque frequency is higher than the frequency threshold 66. When otherwise (i.e., the road surface reaction torque frequency ≦ the frequency threshold), the frequency comparator 65 sets the frequency flag to "1".

Finally, the logical product unit 42 calculates the logical product of the difference flag and the frequency flag, and outputs a bad road traveling determination result (e.g., a flag "0" in case where the vehicle is traveling on a bad road).

Here, note that, as an example, the difference between the road surface reaction torque and the standard road surface reaction torque is used in the difference calculator 60, but a ratio calculator (not shown) may be provided instead of the difference calculator 60, so that use can be made of the ratio of the road surface reaction torque to the standard road surface reaction torque. In addition, both the difference and the ratio between the road surface reaction torque and the standard road surface reaction torque may be used.

Further, a well-known frequency specifying or determining technique using a real-time FFT or the like may be employed as the frequency determining unit 64.

Figure 7:
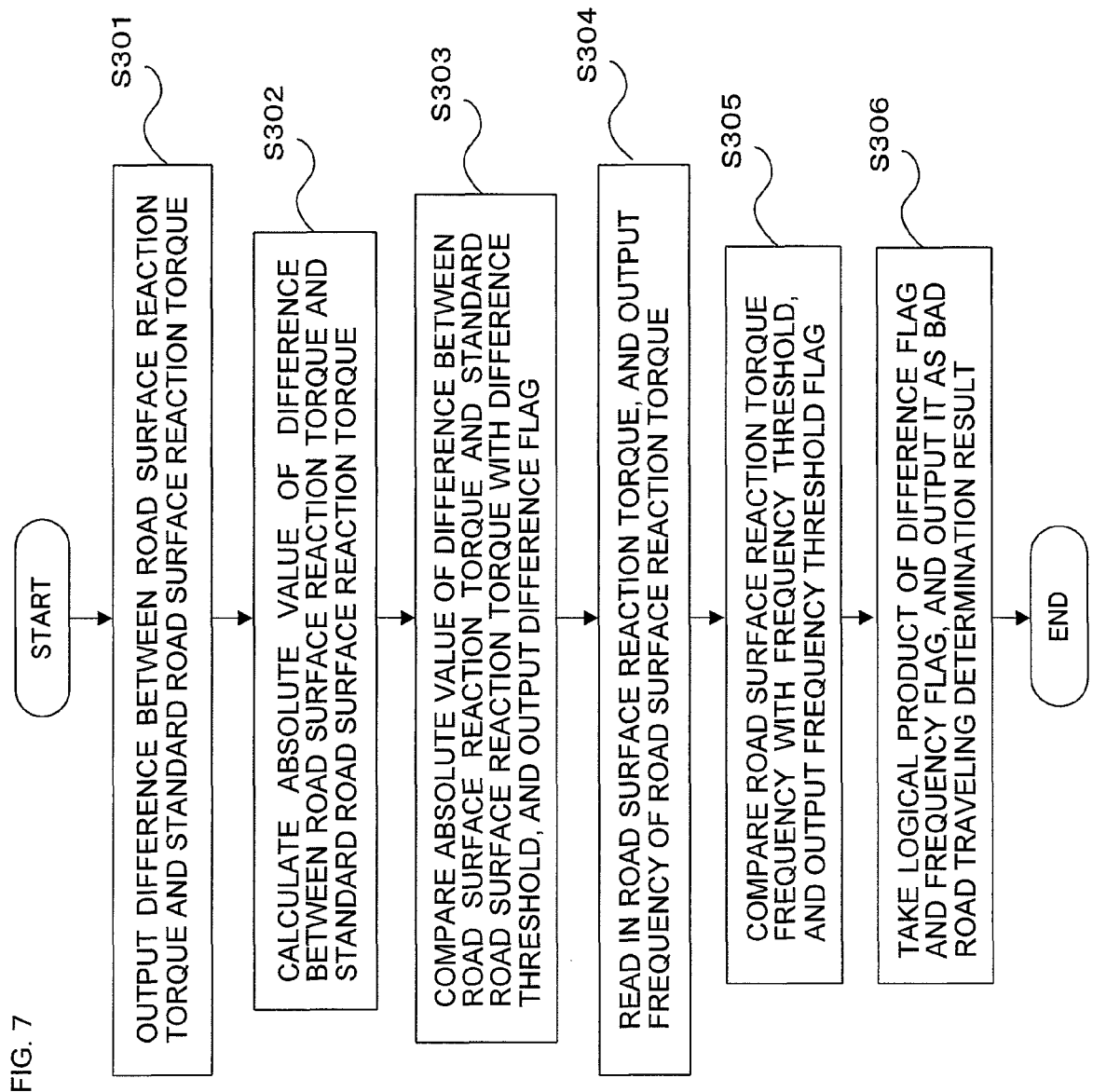
FIG. 7 is a flow chart illustrating the operation of the bad road travel determining unit according to the first embodiment of the present invention.

FIG. 7 is a flow chart illustrating the operation of the bad road travel determining unit 40. In FIG. 7, first, the difference calculator 60 calculates and outputs the difference between the road surface reaction torque and the standard road surface reaction torque (step S301), and the absolute value calculator 61 calculates the absolute value of the difference between the road surface reaction torque and the standard road surface reaction torque (step S302).

Subsequently, the difference comparator 62 compares the absolute value of the difference between the road surface reaction torque and the standard road surface reaction torque with the predetermined difference threshold 63, and outputs a difference flag (e.g., "0" in the case of the absolute value of the difference>the difference threshold) (step S303).

The frequency determining unit 64 reads in the road surface reaction torque, determines and outputs the frequency of the road surface reaction torque (step S304), and the frequency comparator 65 compares the road surface reaction torque frequency with the frequency threshold 66, and outputs a frequency flag (e.g., "0" in the case of the road surface reaction torque frequency>the frequency threshold) (step S305).

Finally, the logical product unit 42 calculates the logical product of the difference flag and the frequency flag, and outputs a bad road traveling determination result "0" when at least one of the difference flag and the frequency flag indicates a bad road traveling state "0" (step S306), after which the program operation of FIG. 7 is terminated.

Next, specific reference will be made to the operation of the abnormal state determining unit 41 in the vehicle behavior detection inhibiting unit 25 while referring to FIG. 8 and FIG. 9.

Figure 8:
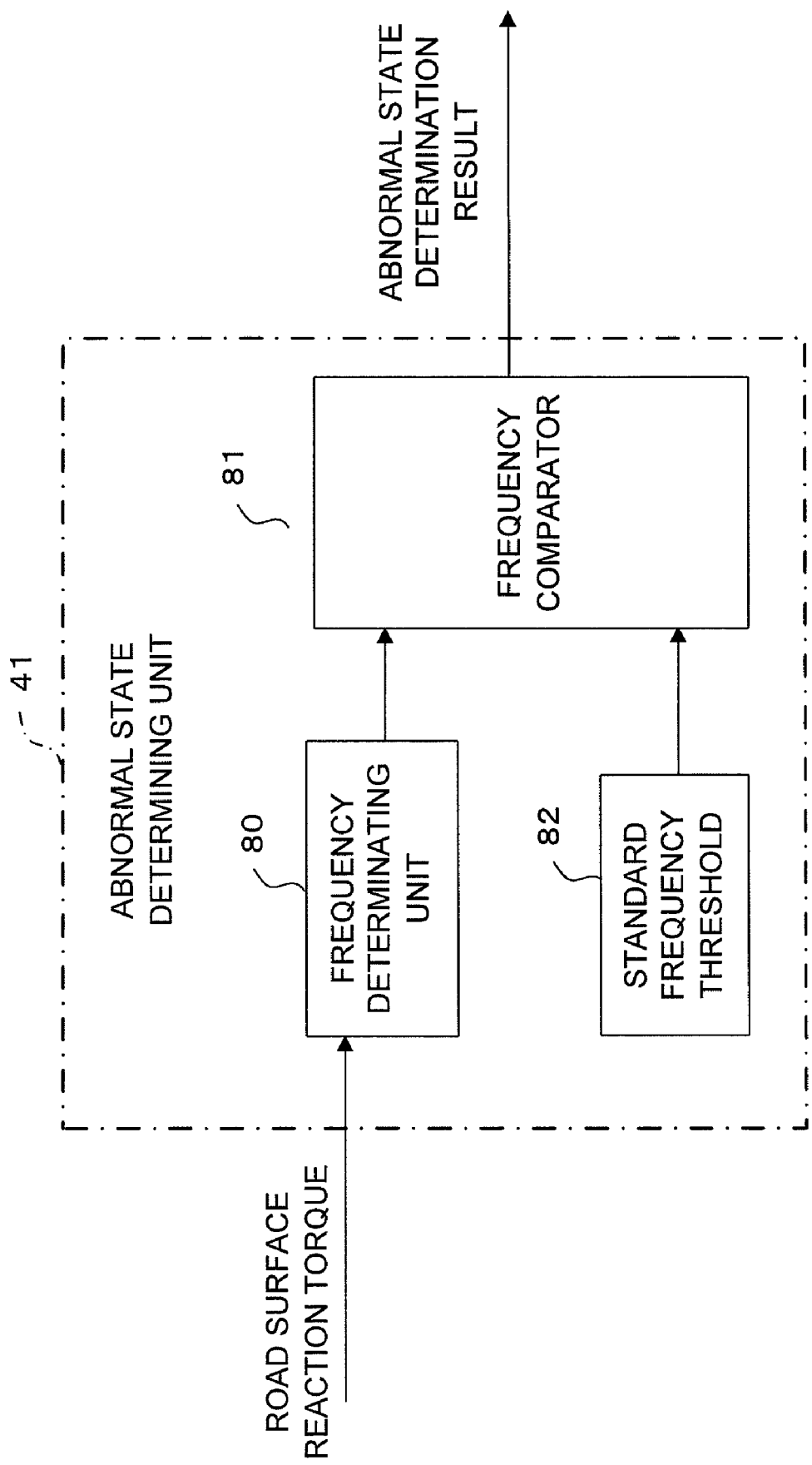
FIG. 8 is a block diagram showing the construction of an abnormal state determining unit according to the first embodiment of the present invention.

FIG. 8 is a block diagram showing the functional construction of the abnormal state determining unit 41. In FIG. 8, the abnormal state determining unit 41 includes a frequency determining unit 80 and a frequency comparator 81.

The frequency determining unit 80 reads in the standard road surface reaction torque, determines and outputs the frequency of the standard road surface reaction torque.

The frequency comparator 81 compares the standard road surface reaction torque frequency with a predetermined standard frequency threshold 82, and sets the frequency flag to "0" and outputs it as an abnormal state determination result when the standard road surface reaction torque frequency is higher than the standard frequency threshold 82. When otherwise (i.e., the standard road surface reaction torque frequency≦the standard frequency threshold), the frequency comparator 81 sets the flag for the abnormal state determination result to "1".

Figure 9:
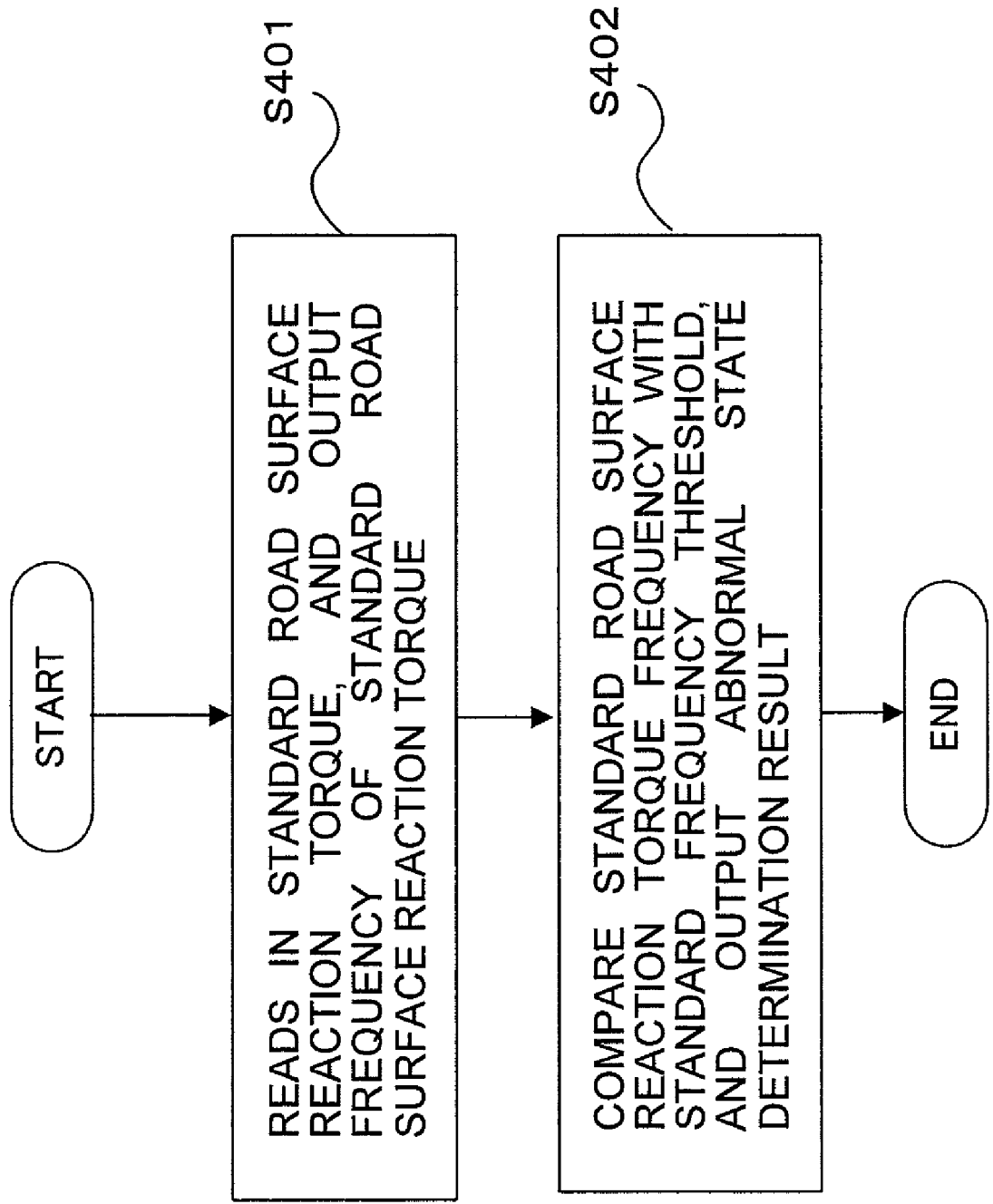
FIG. 9 is a flow chart illustrating the operation of the abnormal state determining unit according to the first embodiment of the present invention.

FIG. 9 is a flow chart illustrating the operation of the abnormal state determining unit 41.

In FIG. 9, first of all, the frequency determining unit 80 reads in the standard road surface reaction torque, determines and outputs the frequency of the standard road surface reaction torque (step S401).

Subsequently, the frequency comparator 81 compares the standard road surface reaction torque frequency with the standard frequency threshold 82, outputs an abnormal state determination result (e.g., a flag "0" in the case of the vehicle being in an abnormal state) (step S402), and then terminates the program operation of FIG. 9.

Hereinafter, reference will be made to the effect of the vehicle behavior detection apparatus according to the first embodiment of the present invention while referring to FIG. 10.

Figure 10:
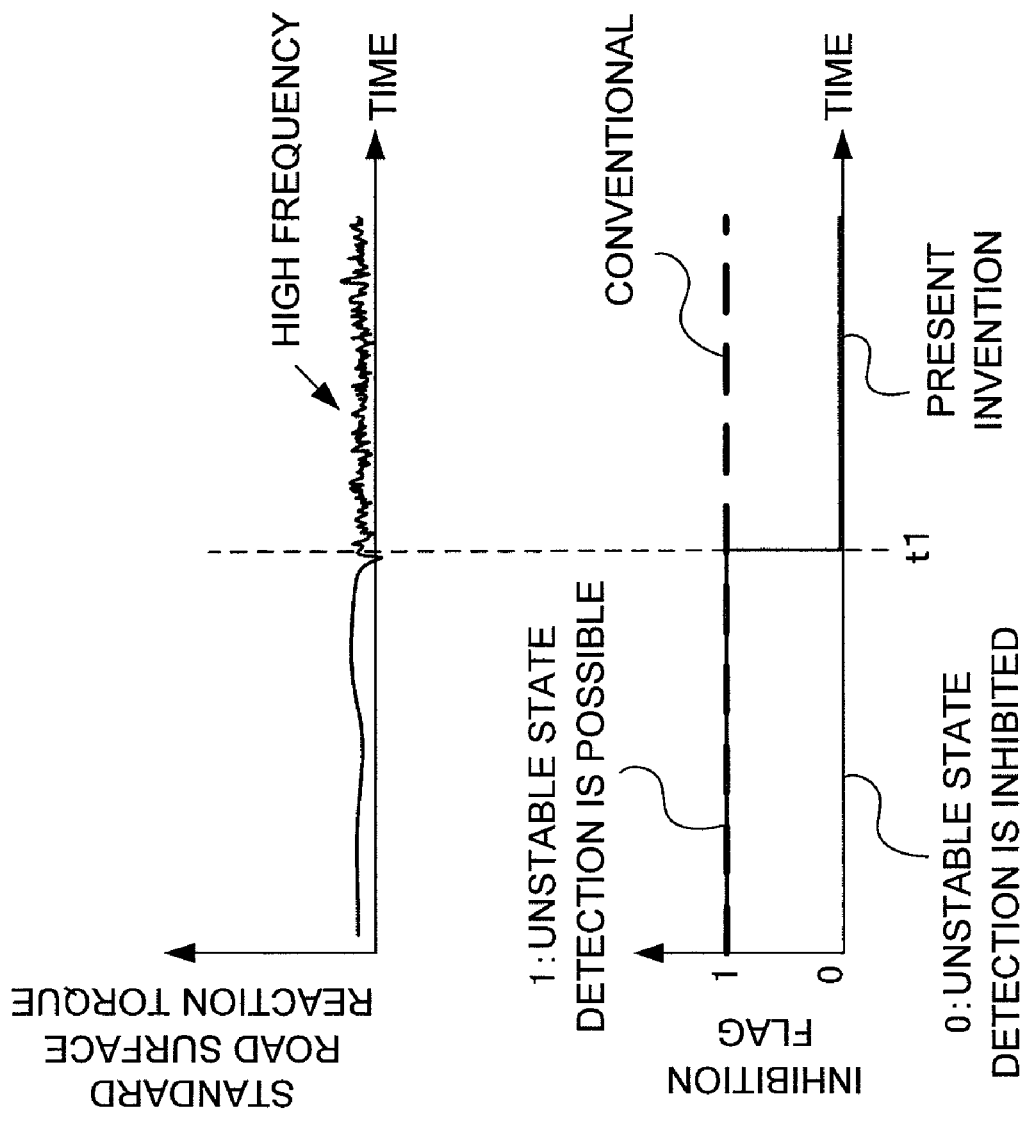
FIG. 10 is a view showing an effect of the vehicle behavior detection inhibiting unit according to the first embodiment of the present invention.

FIG. 10 is an explanatory view showing the time waveforms of the standard road surface reaction torque (upper row) and the inhibition flag (lower row), wherein the axis of abscissa represents time, and a broken line represents the characteristic of a conventional apparatus (without any inhibition flag).

In FIG. 10, the standard road surface reaction torque becomes a high frequency state from time point t1, but in the conventional apparatus (the broken line characteristic) in which there is no inhibition flag, an unstable state of the vehicle behavior can be detected even when the standard road surface reaction torque is in the state of high frequency, so there is the possibility of incorrectly detecting the vehicle unstable state.

In contrast to this, according to the first embodiment of the present invention, when the standard road surface reaction torque becomes a high frequency state at time point t1, a determination is made that the vehicle is in an abnormal state, and the inhibition flag is set from "1" to "0". As a result, the detection of an unstable state of the vehicle is inhibited, thereby making it possible to avoid incorrect detection of an unstable state of the vehicle.

As described above, the vehicle behavior detection apparatus according to the first embodiment of the present invention (FIG. 1 through FIG. 10) includes the road surface reaction torque detecting unit 23 that detects the road surface reaction torque 16 which the tires 6 of the vehicle receive from the road surface, the steering angle detecting unit 21 that detects the steering angle of the vehicle, the vehicle speed detecting unit 22 that detects the travel speed of the vehicle, the standard road surface reaction torque calculating unit 24 that calculates the standard road surface reaction torque from the individual detected values of the steering angle and the vehicle speed, the vehicle behavior state detecting unit 26 that detects the unstable state of the vehicle, and the vehicle behavior detection inhibiting unit 25 that inhibits or invalidates the vehicle behavior state detecting unit 26 based on the detected value of the road surface reaction torque and the calculated value of the standard road surface reaction torque.

The vehicle behavior detection inhibiting unit 25 includes the bad road travel determining unit 40 that determines whether the vehicle is traveling on a bad road, and outputs an inhibition flag for inhibiting or invalidating the vehicle behavior state detecting unit 26 in case where it is determined by the bad road travel determining unit 40 that the vehicle is traveling on a bad road.

The bad road travel determining unit 40 makes a determination that the vehicle is traveling on a bad road, in case where at least one of the deviation and the ratio between the detected value of the road surface reaction torque and the calculated value of the standard road surface reaction torque is larger than a predetermined threshold (e.g., the difference threshold 63).

In addition, the bad road travel determining unit 40 also makes a determination that the vehicle is traveling on a bad road, in case where the detected value of the road surface reaction torque is higher than a predetermined frequency (e.g., the frequency threshold 66).

Further, the vehicle behavior detection inhibiting unit 25 includes the abnormal state determining unit 41 that determines whether the vehicle is in an abnormal state, and outputs an inhibition flag for inhibiting or invalidating the vehicle behavior state detecting unit 26 in case where it is determined by the abnormal state determining unit 41 that the vehicle is in an abnormal state.

The abnormal state determining unit 41 makes a determination that the vehicle is in an abnormal state, in case where the calculated value of the standard road surface reaction torque is higher than a predetermined frequency (e.g., the standard frequency threshold 82).

Thus, in the vehicle behavior detection apparatus in which the road surface reaction torque is detected from the steering torque 7 of the driver and the assist torque 8 of the electric power steering or the motor 3, and the unstable state of the vehicle is detected based on the standard road surface reaction torque and the road surface reaction torque, it is possible to detect the unstable state of the vehicle in an accurate manner while avoiding erroneous determination, by inhibiting the detection of the unstable state of the vehicle as traveling on a bad road when at least one of the deviation and the ratio between the road surface reaction torque and the standard road surface reaction torque is larger than a predetermined threshold.

In addition, in case where the road surface reaction torque is higher than the frequency threshold 66, it is determined that the vehicle is traveling on a bad road, thereby inhibiting the detection of the unstable state of the vehicle, and also in case where the standard road surface reaction torque has a frequency higher than the standard frequency threshold 82, it is determined that the vehicle is in an abnormal state, and hence the detection of the unstable state of the vehicle is inhibited. As a consequence, an incorrect determination can be avoided even when the vehicle is traveling on an unpaved road surface or the like, thereby making it possible to detect the unstable state of the vehicle in an accurate manner.

Embodiment 2

Figure 11:
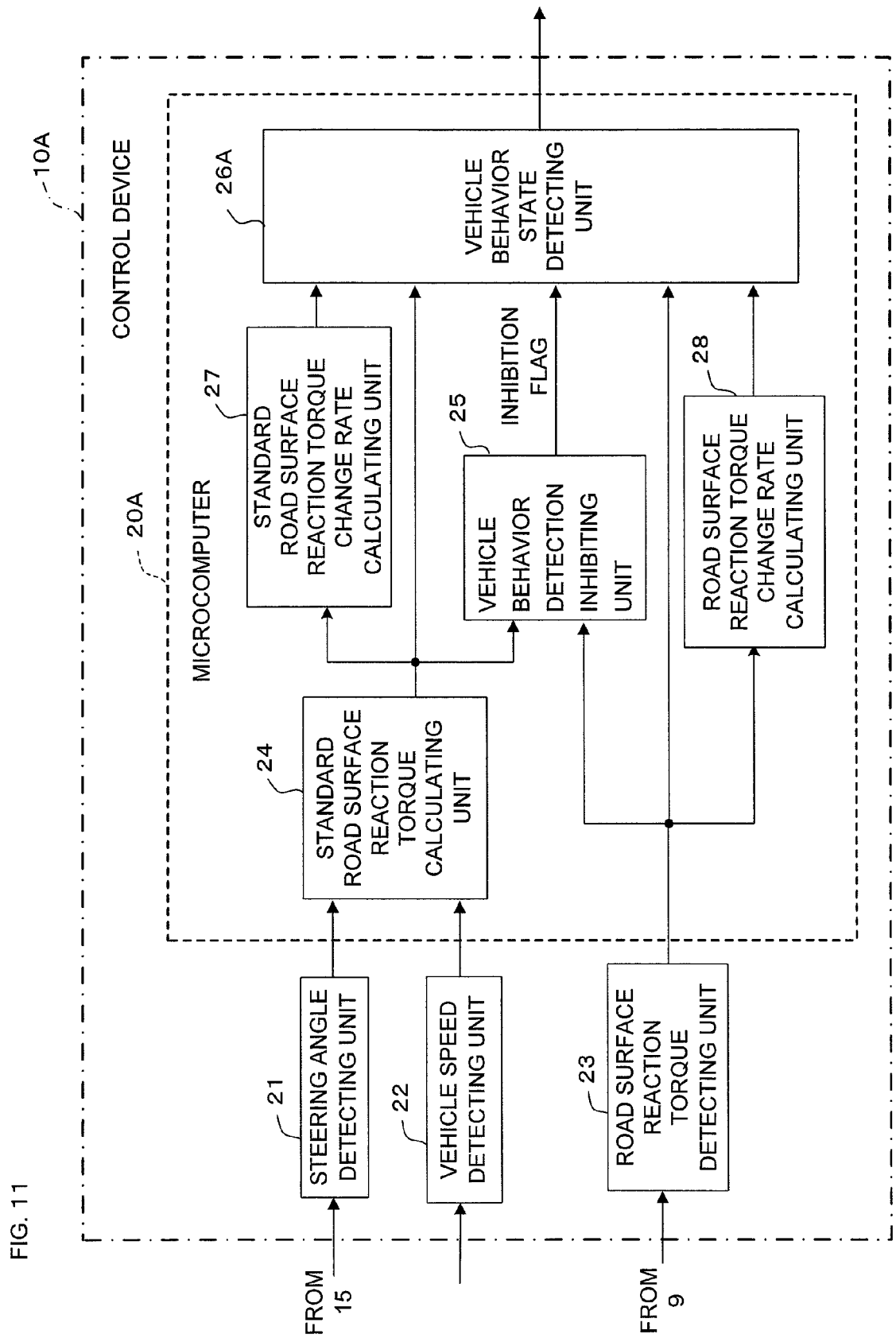
FIG. 11 is a block diagram showing the construction of a vehicle behavior detection apparatus according to a second embodiment of the present invention.

In the above-mentioned first embodiment (FIG. 2), the present invention is applied to the apparatus for detecting the state of vehicle behavior based on the road surface reaction torque and the standard road surface reaction torque, but it may be applied to an apparatus for detecting the state of vehicle behavior, which includes a standard road surface reaction torque change rate calculating unit 27 and a road surface reaction torque change rate calculating unit 28, as shown in FIG. 11, wherein the state of vehicle behavior is detected based on a road surface reaction torque change rate and a standard road surface reaction torque change rate in addition to the detected value of the road surface reaction torque and the standard road surface reaction torque.

FIG. 11 is a block diagram showing a control device 10A which is a major part of a vehicle behavior detection apparatus according to a second embodiment of the present invention, wherein the same parts or units as those described above (see FIG. 2) are identified by the same symbols or by the same symbols with "A" affixed to their ends, while omitting a detailed explanation thereof.

In FIG. 11, a microcomputer 20A in the control device 10A includes the standard road surface reaction torque change rate calculating unit 27 and the road surface reaction torque change rate calculating unit 28 in addition to the above-mentioned components of FIG. 2 such as a standard road surface reaction torque calculating unit 24, a vehicle behavior detection inhibiting unit 25, and a vehicle behavior state detecting unit 26A.

Although the control device 10A and the microcomputer 20A have various functions of a vehicular steering system other than those illustrated therein, similarly as stated above, only those portions thereof which are related to the vehicle behavior detection apparatus are shown herein.

The standard road surface reaction torque change rate calculating unit 27 calculates and outputs a standard road surface reaction torque change rate by using the calculated value of a standard road surface reaction torque as input information.

The road surface reaction torque change rate calculating unit 28 calculates and outputs a road surface reactive torque change rate by using the detected value of a road surface reaction torque 16 as input information.

The vehicle behavior state detecting unit 26A detects an unstable state of a vehicle based on the calculated value (the standard road surface reaction torque change rate) of the standard road surface reaction torque change rate calculating unit 27 and the calculated value (the road surface reaction torque change rate) of the road surface reaction torque change rate calculating unit 28 in addition to the road surface reaction torque 16 and the standard road surface reaction torque. The vehicle behavior state detecting unit 26A is inhibited from outputting the result of its vehicle behavior state detection in response to an inhibition flag from the vehicle behavior detection inhibiting unit 25.

Here, note that in the standard road surface reaction torque change rate calculating unit 27 and the road surface reaction torque change rate calculating unit 28, a well-known technique similar to the above-mentioned one is used to calculate individual time rates of the standard road surface reaction torque and the road surface reaction torque.

Figure 12:
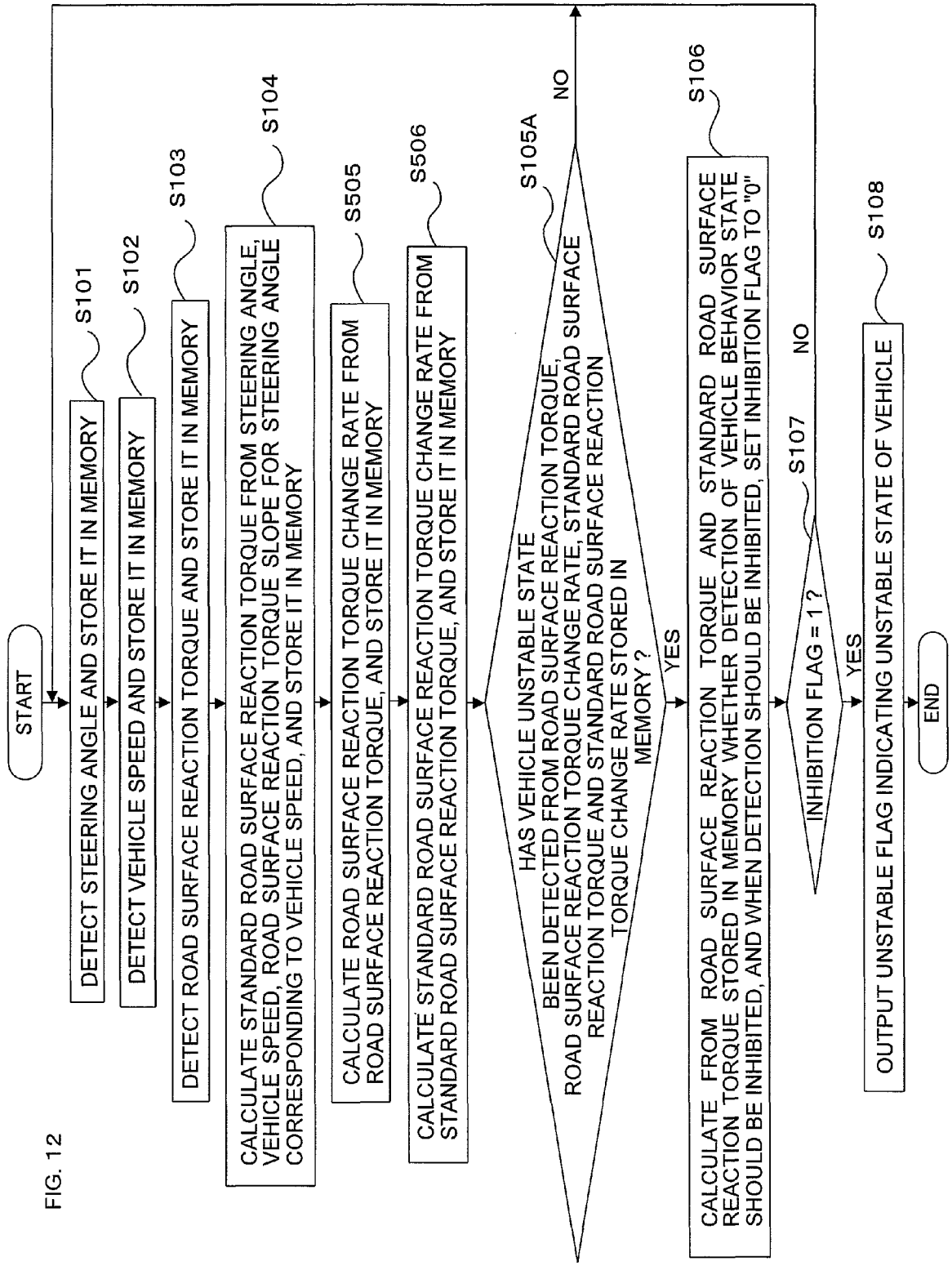
FIG. 12 is a flow chart illustrating the operation of the vehicle behavior detection apparatus according to the second embodiment of the present invention.

Now, reference will be made to the operation of the vehicle behavior detection apparatus (i.e., the control device 10A) according to the second embodiment of the present invention while referring to a flow chart of FIG. 12 together with FIGS. 1 and 11. In FIG. 12, steps S101 through S104 and steps S106 through S108 are processes similar to the above-mentioned ones of the first embodiment (see FIG. 3), and step S105A corresponds to the above-mentioned step S105 in FIG. 3.

First of all, when a control program is started to be executed by the microcomputer 20A, a steering angle, a vehicle speed, the road surface reaction torque 16 and the standard road surface reaction torque are stored in a memory (not shown) in the microcomputer 20A according to the above-mentioned steps S101 through S104.

Subsequently, the road surface reaction torque change rate calculating unit 28 calculates the road surface reaction torque change rate from the road surface reaction torque 16, and stores the calculation result in the memory (step S505).

Similarly, the standard road surface reaction torque change rate calculating unit 27 calculates the standard road surface reaction torque change rate from the standard road surface reaction torque, and stores the calculation result in the memory (step S506).

Next, the vehicle behavior state detecting unit 26A determines, from the road surface reaction torque 16, the standard road surface reaction torque, the road surface reaction torque change rate and the standard road surface reaction torque change rate stored in the memory, whether the unstable state of the vehicle has been detected (step S105A). When it is determined that the unstable state of the vehicle has not been detected (that is, NO), a return is made to step S101 (Start).

On the other hand, when in step S105A it is determined as the vehicle behavior being in an unstable state (that is, YES), the vehicle behavior detection inhibiting unit 25 calculates or determines whether the vehicle behavior state detecting unit 26A should be invalidated (i.e., the detection of the vehicle unstable state should be inhibited). When it is determined that the invalidation (inhibition) should be done, the vehicle behavior detection inhibiting unit 25 sets the inhibition flag to "0" and outputs it (step S106).

Hereinafter, similarly as stated before with reference to the first embodiment, the vehicle behavior state detecting unit 26A inhibits the vehicle behavior detection or outputs an unstable flag indicating the unstable state of the vehicle, based on the state of the inhibition flag according to steps S107 through S108, and then terminates the program operation of FIG. 12.

As described above, according to the second embodiment (FIG. 11) of the present invention, the vehicle behavior detection apparatus includes the road surface reaction torque change rate calculating unit 28 that calculates the rate of change of the road surface reaction torque 16, and the standard road surface reaction torque change rate calculating unit 27 that calculates the rate of change of the standard road surface reaction torque. The vehicle behavior state detecting unit 26A can avoid false or incorrect detection by applying the inhibition flag even to the apparatus that detects the unstable state of the vehicle from the detected value of the road surface reaction torque and the individual calculated values of the standard road surface reaction torque, the road surface reaction torque change rate and the standard road surface reaction torque change rate in a high degree of precision.

While the invention has been described in terms of preferred embodiments, those skilled in the art will recognize that the invention can be practiced with modifications within the spirit and scope of the appended claims.

What is claimed is:

1. A vehicle behavior detection apparatus comprising:
a road surface reaction torque detecting unit that detects a road surface reaction torque which a tire of a vehicle receives from a road surface;
a steering angle detecting unit that detects a steering angle of said vehicle;
a vehicle speed detecting unit that detects a vehicle speed of said vehicle;
a standard road surface reaction torque calculating unit that calculates a standard road surface reaction torque from individual detected values of said steering angle and said vehicle speed;
a vehicle behavior state detecting unit that detects an unstable state of said vehicle; and
a vehicle behavior detection inhibiting unit that invalidates said vehicle behavior state detecting unit based on a detected value of said road surface reaction torque and a calculated value of said standard road surface reaction torque.

2. The vehicle behavior detection apparatus as set forth in claim 1, wherein said vehicle behavior detection inhibiting unit comprises a bad road travel determining unit that determines whether said vehicle is traveling on a bad road, and
wherein said vehicle behavior detection inhibiting unit outputs an inhibition flag for invalidating said vehicle behavior state detecting unit when it is determined by said bad road travel determining unit that said vehicle is traveling on a bad road.

3. The vehicle behavior detection apparatus as set forth in claim 2, wherein said bad road travel determining unit makes a determination that said vehicle is traveling on a bad road, in case where at least one of a deviation and a ratio between the detected value of said road surface reaction torque and the calculated value of said standard road surface reaction torque is larger than a predetermined threshold.

4. The vehicle behavior detection apparatus as set forth in claim 2, wherein said bad road travel determining unit makes a determination that said vehicle is traveling on a bad road, in case where the detected value of said road surface reaction torque is higher than a predetermined frequency.

5. The vehicle behavior detection apparatus as set forth in claim 1, wherein said vehicle behavior detection inhibiting unit comprises an abnormal state determining unit that determines whether said vehicle is in an abnormal state, and
wherein said vehicle behavior detection inhibiting unit outputs an inhibition flag for invalidating said vehicle behavior state detecting unit when it is determined by said abnormal state determining unit that said vehicle is in an abnormal state.

6. The vehicle behavior detection apparatus as set forth in claim 5, wherein said abnormal state determining unit makes a determination that said vehicle is in an abnormal state, in case where the calculated value of said standard road surface reaction torque is higher than a predetermined frequency.

7. The vehicle behavior detection apparatus as set forth in claim 1, further comprising:
a road surface reaction torque change rate calculating unit that calculates a rate of change of said road surface reaction torque; and
a standard road surface reaction torque change rate calculating unit that calculates a rate of change of said standard road surface reaction torque;
wherein said vehicle behavior state detecting unit detects the unstable state of said vehicle from the detected value of said road surface reaction torque and the individual calculated values of said standard road surface reaction torque, said road surface reaction torque change rate and said standard road surface reaction torque change rate.

* * * * *